Oct. 6, 1931.  F. D. PELTIER ET AL  1,825,918
SHAFT SEAL
Filed Feb. 8, 1927
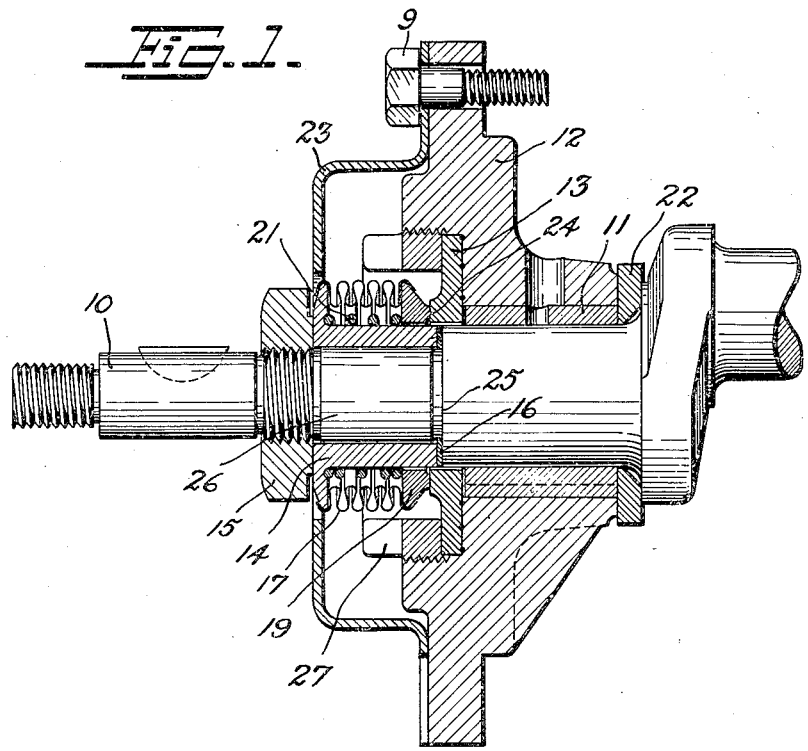
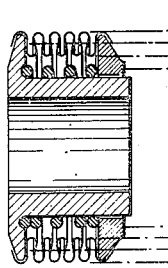
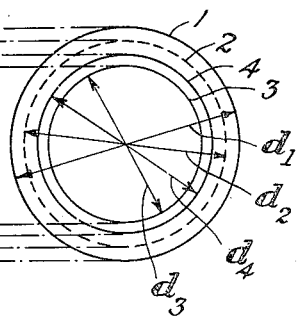

Patented Oct. 6, 1931

1,825,918

UNITED STATES PATENT OFFICE

FRANK DESNOYERS PELTIER AND ELMER WIDERBORG, OF EVANSVILLE, INDIANA, ASSIGNORS, BY MESNE ASSIGNMENTS, TO SERVEL, INC., OF NEW YORK, N. Y., A CORPORATION OF DELAWARE

SHAFT SEAL

Application filed February 8, 1927. Serial No. 166,656.

Our invention relates to shaft seals and is particularly adapted to that type of refrigerating system wherein is employed a compressor having a shaft projecting from within the compressor housing to the outside. In this type of compressor difficulty has been encountered in obtaining a gas tight seal for this shaft to prevent leakage around this shaft where it passes through the compressor housing. When such a compressor is used in connection with a refrigerating system, it is particularly important that no such leakage occurs as not only might the presence of the refrigerant in the atmosphere be objectionable but its loss from the refrigeration system would impair and finally prevent the operation of the system. Our invention hereinafter described accomplishes this and other desired results by means of a simple and effective gas seal.

Fig. 1 is a cross-sectional drawing showing the gas seal assembly; Fig. 2 shows a cross-sectional view of portions of the seal; and Fig. 3 is an area diagram of the seal.

Referring to Fig. 1, reference character 10 designates a crank shaft which projects from the interior of the crank case of the compressor to the exterior and at this end is supported by and rotates in bearing 11. Bearing 11 is in turn supported in bearing plate 12 which is secured to the crank case by bolts 9 and a washer (not shown) so as to form a gas tight joint between these two members, namely, the crank case and the bearing plate 12. Bearing plate 12 is provided with an annular hardened steel ring 13 having a smooth flat outwardly projecting face 24 and so affixed to the bearing plate 12 by means of annular nut 27 as to prevent leakage between them.

A spool 14 is rigidly fixed to the shaft 10 by means of a nut 15 which nut when tightened forces the spool against a washer 16 which bears against a shoulder 25 on the shaft 10. That portion 26 of the shaft 10 which constitutes nearly all of the shaft within the spool 14 is of such a diameter as to make a snug fit within the spool 14 and thus center the spool 14 on the shaft 10 at all times. Hermetically sealed to the spool 14 at its outer enlarged end is the circumferentially corrugated, longitudinally expansible and contractable member 17, referred to hereinafter as a bellows. The opposite end of bellows 17 is hermetically sealed to the annular ring 19 of suitable metal and made with a smooth flat inwardly projecting face in contact with the outwardly projecting face 24 of annular ring 13. A spiral spring 21 surrounds spool 14 and exerts a force which tends to force bearing ring 19 against bearing ring 13. The spool 14 is firmly fixed to the crank shaft 10 by the nut 15 and gasket 16 and causes the bellows 17 to rotate with the shaft 10 which bellows communicates this motion to the annular bearing ring 19 which, owing to its flexible mounting, is free to conform with the surface of the stationary annular bearing ring 13 and hence forms a gas tight seal therewith. Gas which leaks out between the shaft 10 and the bearing 11 passes between the spool 14 and the annular bearing ring 19 and is entrapped within the bellows 17. The gas in bellows 17 is under approximately the same pressure as the gas in the crank case of the compressor. A cover plate 23 is provided and secured in place by bolts 9. Its purpose is to prevent the collection of an undue amount of dirt around the shaft seal and to give a more sightly appearance to the assembly. The thrust exerted by the spring 21 and the gas under pressure in the crank case and the bellows 17 which tends to force the shaft to the left, as shown in Fig. 1, is taken by the hardened steel thrust washer 22 which is free to turn on the crank shaft 10 and on the hub of the bearing plate 12. The pressure of the gas in bellows 17 acts in conjunction with spring 21 to force bearing ring 19 against bearing ring 13 and to thus form a gas tight seal between the two.

Since the other two points of possible leakage in this assembly are closed by the gasket 16 and the gasket (not shown) between the bearing plate 12 and the crank case, this last gas tight seal forms the final seal in the assembly.

It has been stated in the above that the gas pressure within the bellows would act to force the sealing surfaces together. This is shown by means of Figs. 2 and 3, as follows:

Fig. 2 is a cross section of the bellows assembly and Fig. 3 is an end projection of areas of pressure in the seal showing only the circles bounding the areas referred to in the following description.

Letter $d_1$ represents the exterior diameter of the bellows, the cross sectional area of which is represented by $A_1$ and which is bounded by circle 1.

$d_4$ represents the interior diameter of the bellows, the cross sectional area of which is represented by $A_4$ and which is bounded by circle 4.

$d_2$ represents the diameter of a hypothetical circle whose area $A_2$ is equal to the mean of the areas $$A_1 \text{ and } A_4,$$
$$(A_2 = \sqrt{A_1 \times A_4})$$

and is bounded by circle 2. $d_2$ is the mean effective diameter of the bellows.

$d_3$ represents the mean effective diameter of the bearing surfaces whose cross sectional area is represented by $A_3$ and bounded by circle 3.

Assume the absolute pressure acting inside of the bellows to have a value of X pounds per unit area. If both ends of the bellows were closed the force exerted to expand the bellows longitudinally would be equal to the unit force acting on an area which is equivalent to the mean area of the internal and external areas of the corrugations, or in other words, the hypothetical area $A_2$. However, the right hand end is but partially closed by the bearing ring 19. The effective opening left in this end has a diameter equal to the mean diameter $d_3$ of the sealing surfaces. Of course, this opening does not open to the atmosphere but to the crank case of the compressor so that the absolute pressure within the opening is X pounds per unit area.

Now, consider the forces exclusive of the force exerted by spring 21, acting on the bearing ring 19. That annular portion of it within the mean circumference of the bearing surface 24 will be acted upon on both sides by the pressure X and hence will have no tendency because of these pressures to move longitudinally either way. However, that annular portion of bearing ring 19 included between the circumference of the hypothetical circle 2 and the mean circumference of the bearing surfaces is subjected on its side adjoining the bellows to the pressure X and on its opposite side to atmospheric pressure. Hence, the total resultant force tending to move the bearing ring to the right will be equal to this annular area included between the hypothetical circle 2 and the mean circumference of the bearing surface 24 represented by circle 3 multiplied by the difference between the pressure X and atmospheric pressure. This difference in pressures is what is commonly termed gauge pressure.

In the above discussion it has been assumed that the mean diameter of the bearing surfaces is less than the diameter of the hypothetical circle 2. If, on the other hand, the mean diameter of the bearing surface is greater than the diameter of the hypothetical circle 2, that annular portion of the ring 19 included between the mean circumference of the bearing surface and the hypothetical circle 2 will be subjected on the side away from the bellows to the pressure X and on the side toward the bellows to atmospheric pressure and hence will tend to move to the left and open the seal. Therefore, the mean diameter of the bearing surfaces must be less than the diameter of the hypothetical circle 2 in order to have the pressure within the bellows exert a force tending to keep the bearing surfaces of rings 19 and 13 in contact. Thus, by proper apportioning of the mean diameter of the bearing surfaces in relation to the diameter of the hypothetical circle, the desired force to hold the sealing surfaces together may be obtained. Of course, this force will be directly dependent on the pressure existing in the bellows and this is to be desired as the increase in tendency of leakage past the sealing surfaces due to an increase in pressure will be offset by an increase in force acting to force the sealing surfaces together. It is undesirable that a force sufficient to prevent leakage at the highest pressure possible in the crank case and bellows, should be exerted at times when lower pressures exist, for at such times this excessive force would cause unnecessary friction and wear. The spring 21 is provided to aid the above force to keep the sealing surfaces in contact and is necessary when atmospheric pressure is greater than the pressure in the bellows as is the case, if methyl chloride is used, only when drawing a vacuum on the system preparatory to introducing the charge of methyl chloride.

Having described our invention, what we claim is:

1. A shaft seal comprising a spool adapted to fit snugly to the shaft to rotate therewith and having an enlarged end, a bellows hermetically sealed to said end and having a given mean effective diameter, a bearing ring surrounding said spool and hermetically sealed to said bellows, a bearing surface adjacent the bearing surface of said ring, said mean effective diameter being of greater dimension than the mean effective diameter of the bearing surface of the bearing ring and a compression spring between said end and bearing ring.

2. A shaft seal comprising a spool adapted to fit snugly to the shaft to rotate therewith and having an enlarged end, a bellows hermetically sealed to said end and having a given mean effective diameter, a bearing ring surrounding said spool and hermetically sealed to the other end of said bellows and a bearing surface adjacent the bearing surface of said ring, said mean effective diameter being of greater dimension than the mean effective diameter of the bearing surface of the bearing ring.

3. In a compressor or the like, a shaft having a shoulder and a bearing portion within the shoulder, a spool surrounding the bearing portion and arranged to rotate with the shaft, said spool having an enlarged end, a bellows hermetically sealed to said end and having a given mean effective diameter, a bearing ring surrounding said spool and hermetically sealed to said bellows, a bearing surface adjacent the bearing surface of said ring, said mean effective diameter being of greater dimension than the mean effective diameter of the bearing surface of the bearing ring and a nut on said shaft for pressing said spool against said shoulder.

4. In a compressor or the like, a shaft having a shoulder and a bearing portion within the shoulder, a spool surrounding the bearing portion and arranged to rotate with the shaft, said spool having an enlarged end, a bellows hermetically sealed to said end and having a given mean effective diameter, a bearing ring surrounding said spool and hermetically sealed to said bellows, a bearing surface adjacent the bearing surface of said ring, said mean effective diameter being of greater dimension than the mean effective diameter of the bearing surface of the bearing ring, a nut on said shaft for pressing said spool against said shoulder and a compression spring between said end and bearing ring.

5. In a compressor or the like, a crank shaft, a shoulder on said crank shaft between portions of different diameters, a spool mounted on the portion of smaller diameter and abutting against said shoulder, a threaded portion of said crank shaft adjacent said portion of smaller diameter, a nut having internal screw threads engaging said threaded portion and holding said spool against said shoulder, an enlarged end on said spool, a bellows hermetically attached to said enlarged end, a bearing ring hermetically attached to the other end of said bellows and a bearing surface adjacent the bearing surface of said ring, the remainder of said crank shaft from said threaded portion outward being of less diameter than said threaded portion.

6. In a compressor or the like, a crank shaft, a shoulder on said crank shaft between portions of different diameters, a spool mounted on the portion of smaller diameter and abutting against said shoulder, a threaded portion of said crank shaft adjacent said portion of smaller diameter, a nut having internal screw threads engaging said threaded portion and holding said spool against said shoulder, an enlarged end on said spool, a bellows hermetically attached to said enlarged end, a bearing ring hermetically attached to the other end of said bellows, a compression spring between said enlarged end and said bearing ring and supported by said spool and a bearing surface adjacent the bearing surface of said ring, the remainder of the crank shaft from said threaded portion outward being of less diameter than said threaded portion.

7. In a compressor or the like, a crank shaft, a shoulder on said crank shaft between portions of different diameters, a spool mounted on the portion of smaller diameter and abutting against said shoulder, a threaded portion of said crank shaft adjacent said portion of smaller diameter, a nut having internal screw threads engaging said threaded portion and holding said spool against said shoulder, an enlarged end on said spool, a bellows hermetically attached to said enlarged end, a bearing ring hermetically attached to the other end of said bellows, a compression spring between said enlarged end and said bearing ring and supported by said spool and a bearing surface adjacent the bearing surface of said ring, the effective area of said bellows being greater than that of said bearing surfaces whereby pressure within the bellows forces said bearing surfaces together and the remainder of said crank shaft from said threaded portion outward being of less diameter than said threaded portion.

In testimony whereof we hereunto affix our signatures.

FRANK DESNOYERS PELTIER.
ELMER WIDERBORG.